No. 734,258. Patented July 21, 1903.

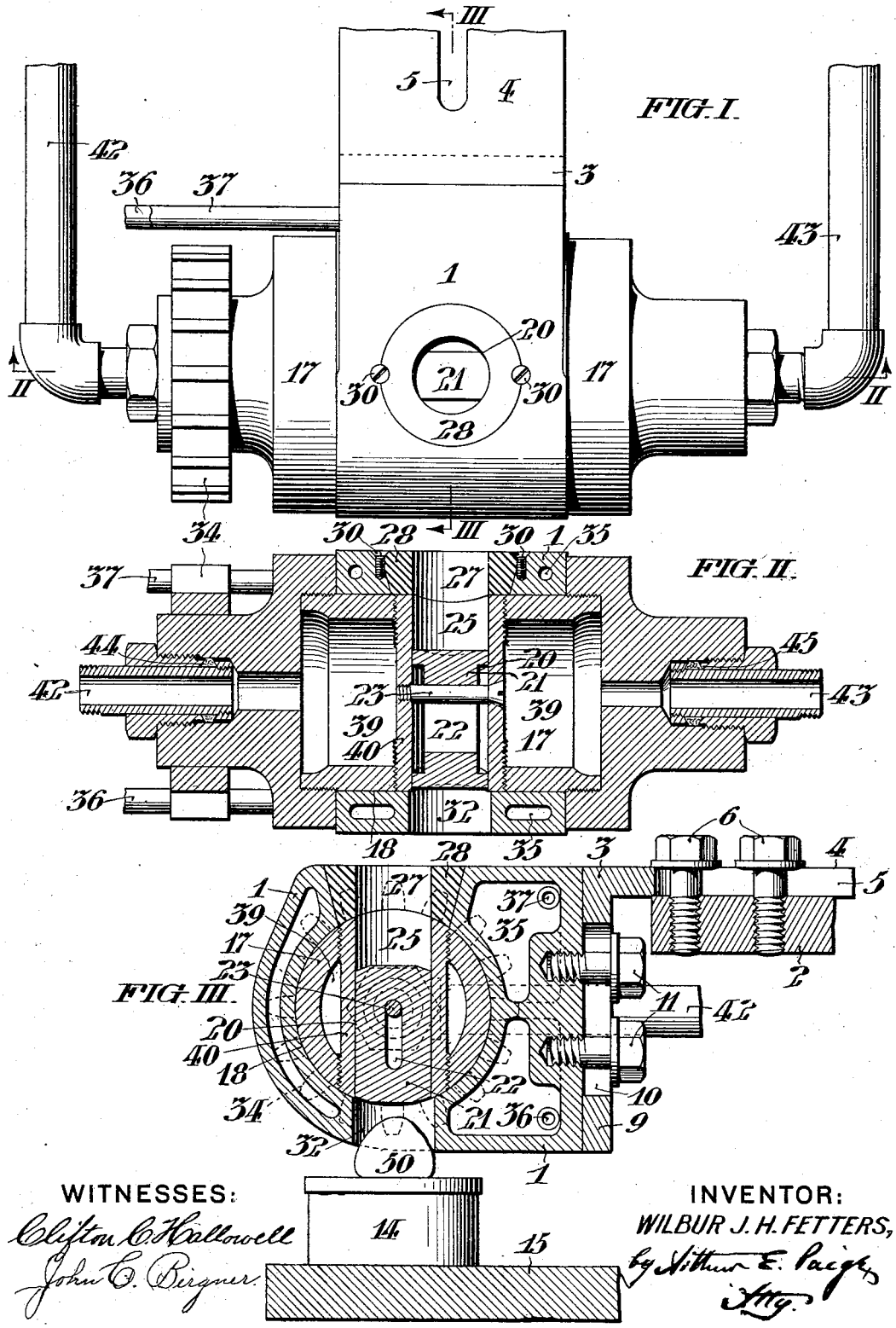

UNITED STATES PATENT OFFICE.

WILBUR J. H. FETTERS, OF PHILADELPHIA, PENNSYLVANIA.

GLASS-SHEARING DEVICE.

SPECIFICATION forming part of Letters Patent No. 734,258, dated July 21, 1903.

Application filed July 8, 1902. Serial No. 114,771. (No model.)

*To all whom it may concern:*

Be it known that I, WILBUR J. H. FETTERS, of Philadelphia, in the State of Pennsylvania, have invented certain new and useful Improvements in Glass-Shearing Devices, whereof the following is a specification, reference being had to the accompanying drawings.

It is the object of my invention to provide an attachment for a glass-forming machine adapted to automatically shear molten glass and supply the same to a mold or molds comprised in said machine.

The form of my invention hereinafter described comprises a casing adapted to be secured in stationary relation with the glass-forming machine and a shearing-roller mounted to rotate in said casing in such relation with the operation of said glass-forming machine as to shear and deposit the glass in proper relation with the molds utilized in said machine.

My invention comprehends the various novel features of construction and arrangement hereinafter more definitely specified and claimed.

In the accompanying drawings, Figure I is a plan view showing a convenient embodiment of my invention. Fig. II is a vertical sectional view taken on the line II II in Fig. I. Fig. III is a vertical sectional view taken on the line III III in Fig. I and showing the approximate position of said shearing device with respect to the glass-mold.

In said figures, 1 is a casing which may be conveniently attached to the frame 2 of the glass-forming machine by the bracket 3, whose horizontal member 4 is provided with the slot 5, engaged with the bolts 6, entered in said frame 2. The vertical member 9 of said bracket 3 is provided with the slot 10, engaged with the bolts 11, which are entered in the casing 1. It is to be understood that the arrangement is such that the casing 1 may be adjusted both vertically and horizontally with respect to the supporting-frame 2, so as to be in proper relation with the glass-mold 14, which may be carried by the rotary table 15, forming part of the glass-forming machine. The shearing-roller 17 is mounted to rotate in the bearing 18 in said casing 1 and comprises a diametrically-disposed passage-way 20, in which is mounted a reciprocatory plunger 21, which is provided with the slot 22 to receive the cross-bar 23, which limits its motion of reciprocation, and the arrangement is such that said plunger tends to gravitate to the lower end of said passage-way 20 to present the recess 25 in alinement with the opening 27 in said casing. I find it convenient to make the casing 1 of cast-iron and to form said opening in a bushing 28, of steel, which is detachably secured in said casing by the screws 30 or any other convenient means. The opening 32 in the lower side wall of said casing is in diametrical alinement with said opening 27 in the upper wall, and the arrangement is such that said passage-way 20 is presented in registry with said opposed openings 27 and 32 at each half-revolution of the shearing-roller 17, and said roller is conveniently provided with the gear-wheel 34, by which it may be rotated with respect to said casing. Said casing 1 is conveniently provided with the chamber 35 surrounding the bearing 18, and said chamber is provided with the inlet 36 and outlet 37, whereby a fluid may be caused to circulate within said casing to control the temperature thereof.

The shearing-roller 17 comprises the chamber 39, which surrounds the wall 40 of the passage-way 20 and is in communication with the inlet-pipe 42 and outlet-pipe 43, whereby a fluid may be circulated through said roller 17 to control the temperature thereof. As shown in Fig. II, said pipes 42 and 43 are provided with stuffing-boxes 44 and 45, so that said roller 17 may be freely rotated in fluid-tight relation with the pipes 42 43 while the latter remain stationary.

The operation of the device is as follows: A gather of glass is thrust through the opening 27 in the top of the casing 1 to fill the recess 25 at the upper extremity of the passage-way 20. The rotation of said roller 17 shears from said gather a portion of glass, the amount of which is determined by the dimensions of the recess 25, and said portion of glass 50 being presented to the opening 32 the plunger 21 falls to the limit of its motion, as indicated in Fig. III, and ejects said portion 50 into the mold 14, which is presented in proper relation therewith, and simultaneously the recess 25 is presented beneath the opening 27 for another portion of glass.

It is to be understood that tubular walls 40 of different thickness from that shown may be substituted in the roller 17 and plungers 21 of corresponding diameter be mounted therein or other plungers 21 of different lengths may be substituted for that shown, so as to vary the cubical capacity of the recess 25, which determines the dimensions of the portion of glass sheared.

I do not desire to limit myself to the precise details of construction and arrangement which I have shown, as it is obvious that various modifications may be made therein without departing from the essential features of my invention.

I claim—

1. In a glass shearing and measuring device, the combination of a hollow casing having oppositely-arranged upper and lower apertures; a measuring and shearing roller mounted in said casing and having a diametrical passage-way, extending therethrough, of equal diameter with said apertures and arranged to register with both of said apertures simultaneously; a slotted plunger slidably mounted in said passageway; a bar held in said roller and extending through said slot to limit the movement of said plunger; a chamber in the wall of said casing provided with means to transmit a cooling fluid therethrough; said roller being also provided with means to transmit a cooling fluid around said passage-way in the roller; and, means to rotate the roller, whereby a definite amount of molten glass can be sheared off and discharged, at every half-revolution of said roller, substantially as set forth.

2. In a glass-shearing device, the combination with a casing; of a shearing-roller mounted in said casing; a recess in the periphery of said shearing-roller; respective inlet and outlet apertures in said casing arranged to successively register with said recess during the rotation of said roller; a chamber in said roller provided with means to conduct a cooling fluid therethrough; and, means to rotate said roller in said casing, substantially as set forth.

3. In a glass-shearing device the combination with a casing; of a shearing-roller mounted in said casing; a tubular wall detachably mounted in said shearing-roller inclosing a recess in the periphery of said roller; respective inlet and outlet apertures in said casing arranged to successively register with said recess during the rotation of said roller; and means to rotate said roller in said casing, substantially as set forth.

4. In a glass-shearing device, the combination with a casing comprising a cylindrical bearing; of a shearing-roller mounted in said bearing; a recess in the periphery of said shearing-roller; respective inlet and outlet apertures in said casing arranged to successively register with said recess during the rotation of said roller; a chamber in said casing provided with means to conduct a cooling fluid therethrough contiguous to said bearing; and means to rotate said roller in said casing, substantially as set forth.

5. In a glass-shearing device, the combination with a casing comprising a cylindrical bearing; of a shearing-roller mounted in said bearing; a recess in the periphery of said shearing-roller; respective inlet and outlet apertures in said casing arranged to successively register with said recesses during the rotation of said roller; a stationary bushing detachably mounted in said casing surrounding said inlet-aperture; a chamber in said roller provided with means to conduct a cooling fluid therethrough; and means to rotate said roller in said casing, substantially as set forth.

6. In a glass-shearing device, the combination with a casing comprising a cylindrical bearing; of a shearing-roller mounted in said bearing; a recess in the periphery of said shearing-roller; respective inlet and outlet apertures in said casing arranged to successively register with said recess during the rotation of said roller; a stationary bushing detachably mounted in said casing surrounding said inlet-aperture; a chamber in said casing provided with means to conduct a cooling fluid therethrough contiguous to said bearing; and means to rotate said roller in said casing, substantially as set forth.

7. In a glass-shearing device, the combination with a casing comprising a cylindrical bearing; of a shearing-roller mounted in said bearing; a recess in the periphery of said shearing-roller; respective inlet and outlet apertures in said casing arranged to successively register with said recess during the rotation of said roller; a removable bushing mounted in said casing surrounding said inlet-aperture; detachable means arranged to normally retain said bushing in stationary relation to said casing; and, means to rotate said roller in said casing, substantially as set forth.

8. In a glass-shearing device, the combination with a casing comprising a cylindrical bearing; of a shearing-roller mounted in said casing; a recess in the periphery of said shearing-roller; respective inlet and outlet apertures in said casing arranged to successively register with said recess during the rotation of said roller; a conical seat in said casing surrounding said inlet-aperture; a conical bushing mounted in said conical seat surrounding said inlet-aperture; detachable means arranged to normally retain said conical bushing in stationary relation to said casing; and, means to rotate said roller in said casing, substantially as set forth.

In testimony whereof I have hereunto signed my name, at Philadelphia, Pennsylvania, this 3d day of July, 1902.

WILBUR J. H. FETTERS.

Witnesses:
ARTHUR E. PAIGE,
JOSEPH L. BERTON.